Patented Mar. 3, 1925.

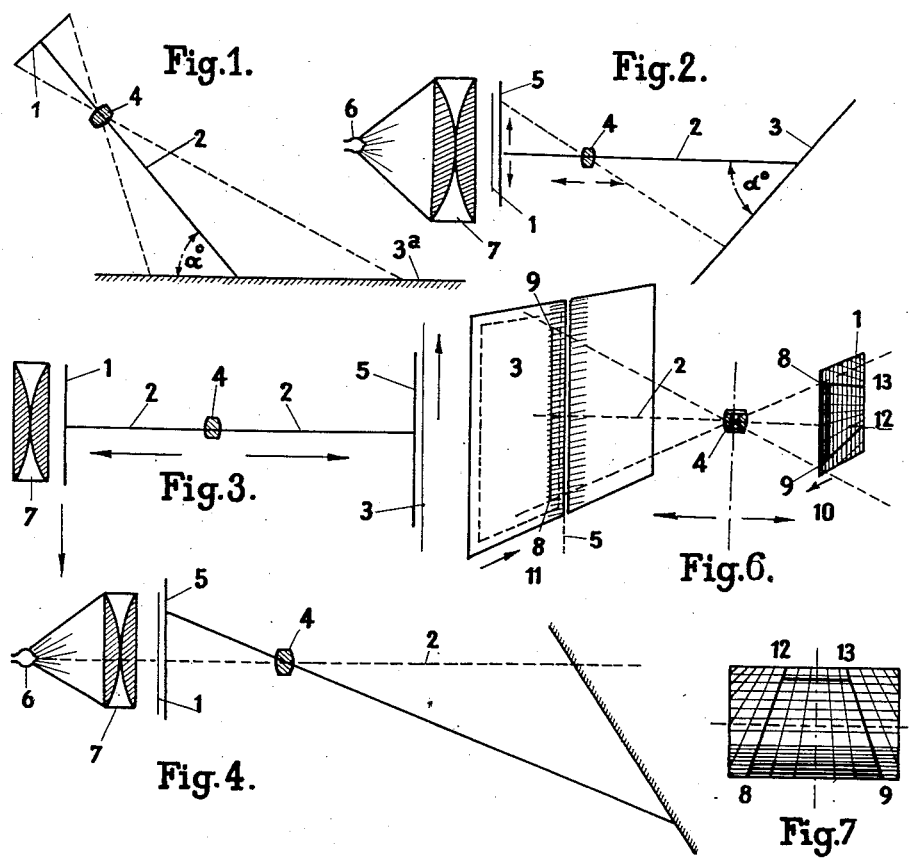

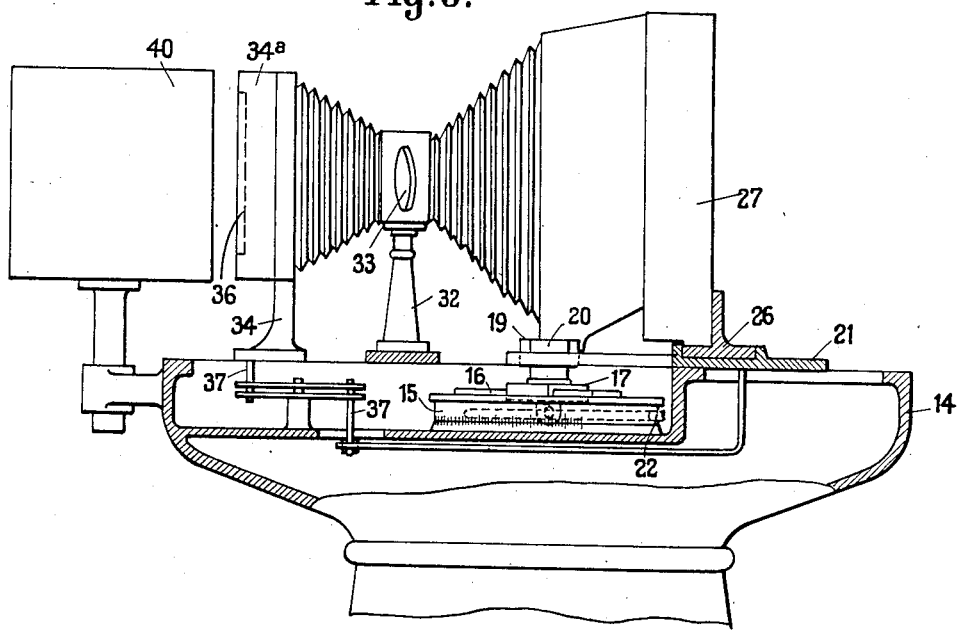
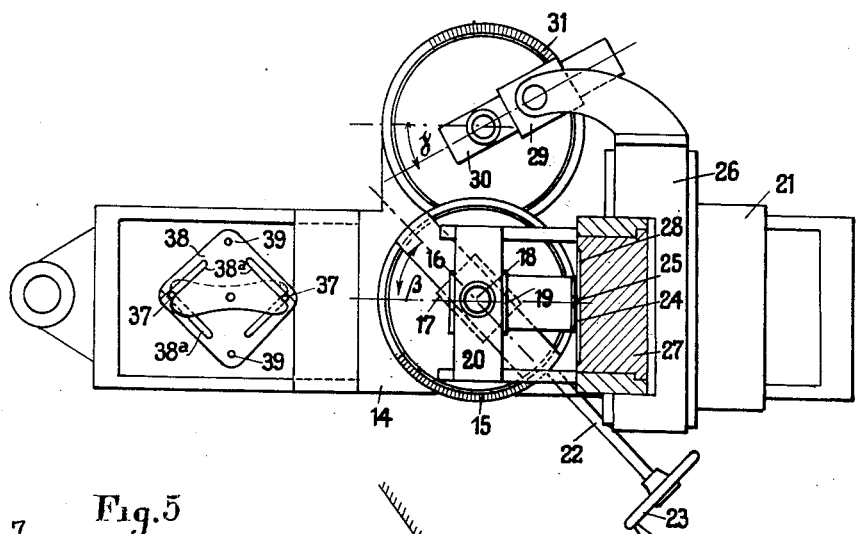
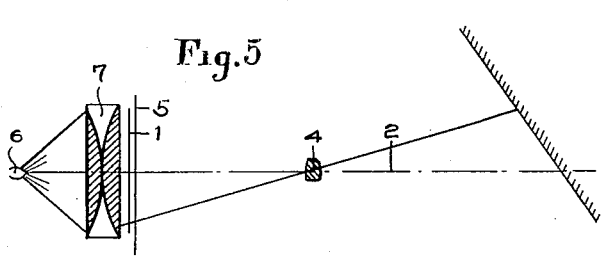

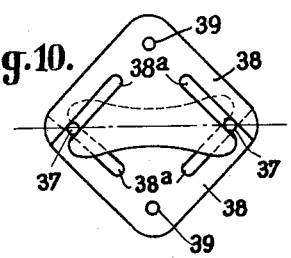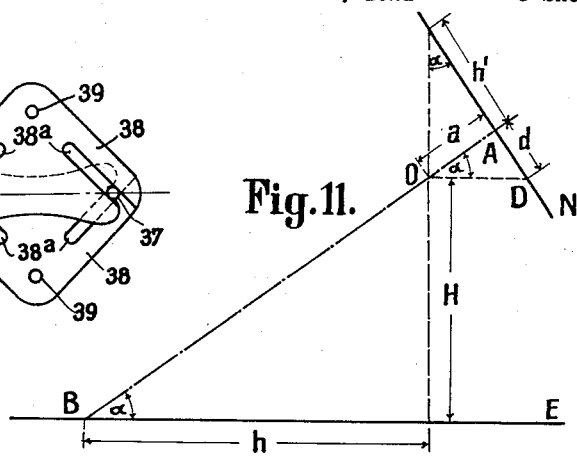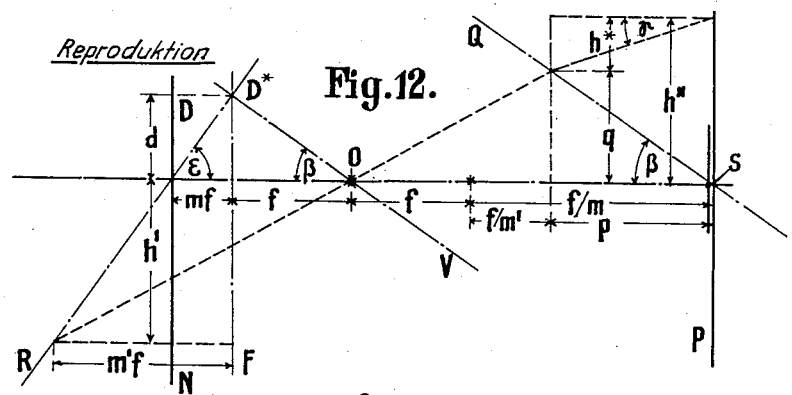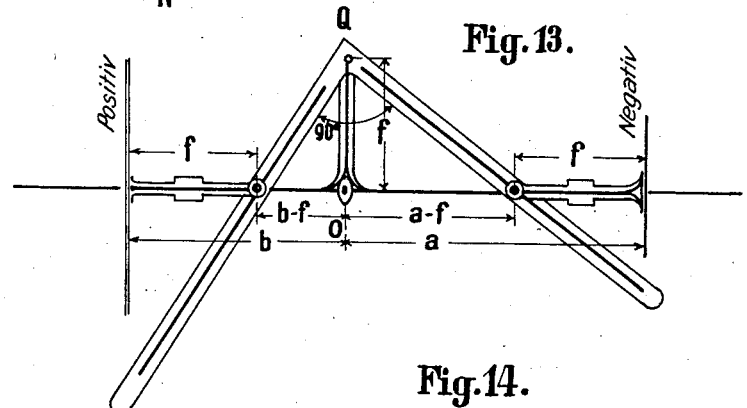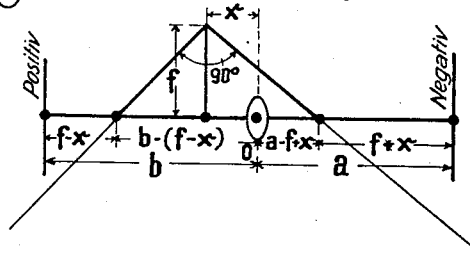

1,528,021

UNITED STATES PATENT OFFICE.

CARL JANZER, JR., OF STUTTGART, GERMANY.

PROCESS OF PHOTOGRAPHIC PRINTING AND APPARATUS THEREFOR.

Application filed July 28, 1921. Serial No. 488,169.

(GRANTED UNDER THE PROVISIONS OF THE ACT OF MARCH 3, 1921, 41 STAT. L., 1313.)

*To all whom it may concern:*

Be it known that I, CARL JANZER, Jr., of German nationality, residing at Stuttgart, Germany, have invented certain new and useful Improvements in or Relating to Processes of Photographic Printing and Apparatus Therefor (for which I have filed applications in Germany, filed May 13, 1916, September 25, 1916, April 2, 1917, and Great Britain, filed December 18, 1920); and I do hereby declare the following to be a full, clear, and exact description of the invention, of which the following is a specification.

This invention relates to photographic methods and apparatus used in transferring photographs from negatives disposed at an angle of inclination to the subject, so that the photographs obtained are equivalent to those transferred from negatives disposed parallel to the subject at the time of exposure.

When the negative is inclined to the subject or, as hereafter referred to, is oblique at the time of exposure, the photograph obtained is distorted if the receiving surface is parallel to the oblique negative during the printing operation, and to avoid this distortion and correct the photograph during printing, it is usual to arrange the oblique negative and the receiving surface at correlated angles to each other and to the optical axis of an associated lens, so that the receiving surface is inclined to the oblique negative at the same angle as to the oblique negative was inclined to the subject at the time of exposure.

Apparatus have been constructed with frames adapted to suitably carry the oblique negative and receiving surface, the frames being pivoted and connected so that the movement of one frame compelled a correct movement of the other.

In order to obtain sharpness in the picture, the position of the lens is adjusted according to know laws, the lens being movable between suitable guides, and the pivotal axis of the frames being in the vertical plane containing the optical axis of the lens.

In all known methods and apparatus for printing from oblique negatives, the whole of the picture is transferred to the receiving surface in one complete exposure.

Now the object of the present invention is to improve the sharpness of definition of photographs taken from oblique negatives. By known means and methods the maximum sharpness of definition is only obtained in the vertical plane containing the optical axis. The present produces the maximum sharpness for the whole picture.

The invention consists in a method of transferring oblique photographs, characterized in that the negative is progressively exposed and transmitted to the receiving surface through a narrow slit fixed at right angles to the optical axis of the lens.

As in photographing from aeroplanes exposure is nearly always made when the plane is inclined to the ground, pictures are obtained which appear oblique as compared with photographs taken when the camera is in a place parallel with the object photographed, so that generally speaking, the negative obtained from a camera on an aeroplane is an oblique negative, and to explain the invention, in the description here following, the treatment of such a negative is referred to.

In order that my invention may be clearly understood I will now describe the same with reference to the accompanying diagrammatic sketches, in which:

Fig. 1 illustrates diagrammatically the arrangement when the negative is exposed during photographic operations from an aeroplane, balloon, or the like;

Figs. 2, 3, 4 and 5 diagrammatically show four alternative arrangements for transferring the photograph according to the method of the present invention;

Figs. 6 and 7 diagrammatically show the transferring process;

Figs. 8, 9, 10 diagrammatically illustrate a simple mechanical arrangement for obtaining synchronous movement of the negative, receiving surface, and the lens;

Fig. 8 being an elevation partly in vertical section;

Fig. 9 a top plan.

Fig. 10 is a detail of the device according to Figs. 8 and 9,

Figs. 11 to 14 are sketches in explanation of the mathematical principles of the device.

Referring first to Figs. 1 to 7 of the accompanying drawings, it will be seen that the plane of exposure, 1, of the photographic camera, stands perpendicularly towards the optical axis 2, and the latter has an inclination $\alpha°$ towards the ground, indicated at $3^A$ (see Fig. 1). Now, according to this invention, the process of transformation must be adjusted corresponding to the condition at the moment of exposure, for example, if the negative plate 1 taken from the aeroplane, or a copy obtained from same, is placed perpendicularly towards the optical axis 2, the picture must be projected on a sensitized surface indicated at 3, which is either, as shown in Fig. 2, adjusted to an angle with the optical axis equal to the angle $\alpha°$ formed between the optical axis and the ground of the moment of exposure, or, as shown in Fig. 3, is at right angles to the optical axis, in which case the lens must be moved to correct perspective and the surface 3 moved to keep it in focus with the lens.

The objective 4 only projects a sharp picture of a surface standing perpendicular to the axis on a receiving plate also perpendicular to the optical axis. Therefore, when object and picture are in the positions shown in Fig. 2, only a narrow strip of the picture will have a sharp reproduction, i. e., in the line of intersection between the sensitized surface and a plane perpendicular to the optical axis at the intersection of the latter with the sensitized surface.

To obtain, however, sharp definition all over the surface of the receiving plate, according to the present invention, the negative is projected through a narrow slit, formed in a suitable member, indicated at 5 in the several figures, moving over the negative, whilst the objective 4 and the receiving plane 3 are adjusted in such a way as to enable the latter to receive in a clear and defined manner the strip of the picture formed by the moving slit 5. The source of light 6, necessary to obtain the projection of the negative, is disposed behind the plate, and between them is placed the usual condensing lens, as indicated at 7.

By adopting this stripwise formation of the picture, the whole negative is gradually and correctly transformed and a sharp picture obtained. The objective is moved correspondingly to the progressive projection for each moment of the whole process of transforming the oblique view into one as seen horizontally.

It is of great importance for the perfect transformation of the picture, that the negative, or picture, the light slit, the objective, and the sensitized receiving plate have the correct proportion of motion one towards the other.

The slit bearer 5 may be placed before the sensitized surface 3, as indicated in Fig. 3, or may be placed before the objective; it must, however, in any case remain permanently on a plane perpendicular to the optical axis 2 of the objective lens 4.

If the slit is held in this position it is necessary that the picture to be transformed as well as the sensitized surface or receiving plate must receive a transverse motion one opposed to the other, perpendicularly to, and at the angle $\alpha°$, respectively to the optical axis, so that the whole picture to be transformed is projected through the slit. Alternatively, of course the receiving surface might be held against transverse motion while the slit member is moved across the receiving surface.

The variations of scale for enlarging and the corresponding adjustment for sharpness of the picture require that the distances between the objective 4 and the sensitized surface 3 (Fig. 3) on the one side of the objective 4 and the picture or negative 1 on the other side be adjustable. For this purpose several arrangements are possible; either the negative plate 1 is stationary in the direction of the optical axis and the objective 4 and the receiving surface 3 are movable along it, or the objective 4 is stationary in the optical axis, while the receiving surface 3 and the plate 1, together with the associated condenser 7 and the illuminant 6, are movable in the direction of the optical axis. Also the receiving frame 3 may be stationary in the direction of the optical axis and the objective 4 and plate 1, together with its associated condenser 7 and illuminant 6 may move along it. These motions in the direction of the optical axis must be continuous and progressive and must be positively related to the above described transverse motions of receiving surface and picture.

Considering now Figs. 6 and 7, the negative 1 is illustrated as comprising a network with a diminishing appearance, that part of the negative nearest the subject photographed being indicated by the numerals 8 and 9, while the distance is indicated by the numerals 12 and 13. As shown in Fig. 6, the negative 1 and the receiving surface 3 are parallel, and it is supposed that the near edge 8, 9 is being transferred to the receiving surface 3 through the slit 5. Through this slit 5 a thin area of the plate is transformed correspondingly, in a selected scale, within the optical limits prescribed by the lens used; the negative plate 1 is then moved in the direction of the arrow 10 (Fig. 6) so that the next narrow parallel strip of the plate appears in the slit and is thrown on the receiving surface 3, which meanwhile is moved in the direction shown by the arrow 11, which movement is opposite to the movement of the negative plate 1 indicated by the arrow 10. This successive projected parallel strip would normally appear, however, on the receiving surface, on account of the diminishing appearance seen in the plate 1 (Figs. 6 and 7) in a different enlargement to the preceding strip. To bring it on the same scale as the latter according to the law of lenses, the objective is moved in a direction along the optical axis 2 towards the plate 1, and the receiving frame 3 in the direction along the optical axis away from the plate 1. To adjust the second parallel strip, two main motions have therefore been necessary.

(1) A motion of the plate 1 and the receiving frame 3 in the respective direction indicated by arrows 10 and 11 transverse to the optical axis (transverse motion).

(2) A motion of the objective 4 in the direction of the optical axis 2 towards the condenser 7, and of the receiving frame 3 along the optical axis 2 away from the condenser 7 (axial motion).

For each following parallel strip of the plate new adjustments in the direction of these two movements would be necessary.

In Figs. 8, 9, and 10 a simple mechanical arrangement is diagrammatically shown for obtaining the required movements of the lens and receiving surface and negative.

In the embodiment of the invention shown in Figs. 8, 9 and 10 a graduated circle 15 is arranged on the main body 14 of the apparatus so that it can be rotated in a ring-shaped guide. A guide bar or ruler 16 is rigidly connected with this graduated circle. A slide 17 is arranged on the ruler 16, a second slide 19 being pivotally connected with slide 17 by the pivot pin 18 and guided upon a guide bar 20. The guide bar 20 is rigidly connected with the carriage 21 mounted on the frame 14 so that it can be displaced in the longitudinal direction. The guide bar 20 stands perpendicular to the longitudinal direction of the supporting frame 14. A screw spindle 22 engages with a nut rigidly connected with slide 17 and is mounted in the guide bar 16 or in the graduated circle 15 which supports this guide bar so that it can rotate but not move in axial direction. The screw spindle may be rotated by any suitable means. By the rotation of the hand wheel the slide 17 is displaced on the guide bar 16, the guide bar 20 and consequently the carriage 21 participating in this displacement. Owing to the inclined position of the guide bar 16 the second slide 19 is also displaced on the guide bar 20. On the slide 19 an obturator 24 is fixed which has a vertical slit 25. This obturator participates in the transverse displacement of slide 19. Behind the obturator a carriage 26, movable in longitudinal direction of the supporting frame, is arranged on the carriage 21. The camera 27 fixed on this carriage 26 serves to receive the exposed plate 28 and to accommodate the same so that it is directly behind the obturator 24. The transverse carriage 26 is fixed on a slide 29 guided on a guide bar 30. This guide bar 30 is fixed on a second graduated circle 31 which is also rotatably connected with the supporting frame 14. The direction of the ruler can thus be adjusted and it determines the amplitude of the transverse movement of the carriage 26 at a longitudinal movement of the carriage 21 and consequently the amplitude of the transverse displacement of the sensitized plate 28.

The lens 33 is rigidly fixed on the supporting frame 14 with the aid of a bracket 32 but so that it can be adjusted.

The supporting frame carries a second carriage 34 movable in longitudinal direction. On this longitudinal carriage 34 a camera 34a is mounted which is designed to receive the picture or negative 36 to be corrected.

The two carriages 34 and 21 carry each one bolt 37. These bolts 37 project through longitudinal slits 38a of the arms of two angle levers 38 hingedly mounted on the supporting frame 14 by means of bolts 39. The bolts 37 serve for coupling the two angle levers.

The longitudinal movement of carriage 21 causes, through the intermediary of the one bolt 37, an oscillation of the angle lever 38. Owing to this oscillation the angle levers act upon the bolt 37 connected with the carriage 34 so that a movement in the direction of the longitudinal axis of the supporting frame is communicated also to this bolt and consequently to the carriage 34. The longitudinal axis of the supporting frame is of the same direction as the optical axis of the apparatus. The angle levers 38 effect therefore, at a displacement of the carriage 21 and consequently of the camera 27 in the direction towards the lens 33, a displacement of the camera 35 in the direction away from the lens and inversely.

The distance of the bolts 39 from the line which connects the pivot bolts 37 is equal to the corresponding focal distance of the lens. The distance of the pivot bolts 37 from the connection line of the bolts 39 is, in the median position of the bolts 39, also equal to this focal distance of the lens. From the selection of these dimensions results, that the distances of the negative and of the sensitized plate from the lens are always in correct mutual proportion as will be hereinafter explained mathematically.

Behind the camera 35 which contains the negative 36 an illuminating apparatus 40 is arranged. The mathematical elements of the apparatus will be hereinafter explained with reference to Figs. 11 and 12.

The mutual relation of the longitudinal and transverse displacements of the several movable parts of the apparatus is, according to the preceding statements, essentially dependent on the adjusting of the direction of the guide bars 3 and 17. The angle between the longitudinal axis of the guide bar 3 and of the optical axis be $\beta$. The angle between the longitudinal axis of the guide bar 17 and the parallel to the optical axis be $\gamma$.

When the angles $\beta$ and $\gamma$ are properly adjusted, distortion-free pictures are produced with the apparatus as will be shown by the following explanations.

At photographing from aeroplanes the ground E is photographed on the negative N in such a manner that the pictures of straight lines are again straight lines and that the straight lines on the negative N, which correspond to straight lines on the ground, intersect in the straight line D which stands at the distance $d$ from the optical axis perpendicularly to the plane of the picture.

By a straight lined movement of the negative N the positive P and the slit S it is ensured, that each point of the negative be copied when it is situated on a plane R and that each point of the positive is exposed when it is situated on a plane Q. It can be imagined that the negative projects first on the plane R parallel to the optical axis, that this plane is then copied through the lens upon the plane Q and that this plane is finally projected, under the angle $\gamma$ of the carriage guide of the positive, obliquely to the optical axis upon the positive. At the projection of a negative on the plane R as well as at the projection from the plane Q upon the positive P, parts which stand normally to the plane of the photograph are copied at the same length, while the parts which stand parallel to the plane of picture are copied lengthened or shortened in similar proportion. Consequently at the copying of plane R on plane Q, at which straight lines on R produce a picture of a straight line on Q, the points of the straight line D* which correspond to the picture D of the horizon on the negative must move into the infinite, e. g. the straight line D must be situated on the copy in the focal plane F of the lens O. D* is the intersection line of this plane with the plane R and the plane Q must be parallel to the plane V through the lens O and the straight line D*.

From this results for the inclination $\beta$ of the plane Q and consequently for the angle between the carriage guide for the slit S and the optical axis, when the slit is arranged in front of the positive, from Figs. 11 and 12:

$$tg\beta = \frac{d}{f} = \frac{a}{f}\frac{d}{a} = \frac{a}{f} tg\alpha \quad 1°$$

$a$ being the extension of the camera on the aeroplane, $\alpha$ the inclination of the optical axis to the ground and $f$ the focal distance of the projection lens.

If the slit is arranged at the negative its carriage guide must form with the optical axis the angle $\varepsilon$ which represents the inclination of this axis to the plane R. From Figs. 11 and 12 follows:

$$tg\varepsilon = \frac{d}{mf} = \frac{a}{f}\frac{d}{am} = \frac{a}{f}\frac{tg\alpha}{m} \quad 2°$$

$m$ is the reduction to which the parts on the R plane, which stand normal to the plane of picture and intersect, at least in their prolongation, the optical axis, are submitted when being copied on the Q plane. After the conditions stated under No. 1 or 2 have been fulfilled parallel lines on the ground E are again copied on the plane Q as parallel lines and it is merely necessary that the scale of the copy in the direction of the plane of the picture be equal to the scale normal to the plane of picture to make the copy of the positive similar to the ground E. This is effected by displacing the positive obliquely to the optical axis on a carriage the guiding of which forms the angle $\gamma$ with this axle.

From Figs. 11 and 12 results for the scale of the picture normal to the plane of picture the formula:

$$M = \frac{OA}{OB} \cdot \frac{1}{m} = \frac{a \sin \alpha}{Hm}$$

Consequently the distance $h''$ on the positive P which corresponds to the distance $h$ on the ground under the optical axis must be:—

$$h'' = Mh = \frac{a \sin \alpha}{Hm} \frac{H}{tg\alpha} = \frac{a}{m} \cos \alpha.$$

From Figs. 11 and 12 results the following:

$$h'' = h^* + q = ptg\gamma + \frac{h'}{m'} = \frac{(f.-f)}{mm} \times tg\gamma + \frac{a}{tg\alpha m'} = \frac{1}{m}\left(f.\left(1 - \frac{m}{m'}\right)tg\gamma + \frac{am}{tg\alpha m'}\right)$$

$m'$ is the reduction to which a strip of the negative, normally to the plane of picture at the distance $h'$ from the optical axis, is submitted when being copied upon the positive.

$$tg\gamma = \left(a \cos \alpha - \frac{a}{tg\alpha} - \frac{m}{m'}\right) : f\left(1 - \frac{m}{m'}\right) = \frac{a}{f} \frac{\cos\alpha - \sin^2\alpha/tg\alpha}{1 - \sin^2\alpha} = \frac{a}{f} \frac{1 - \sin\alpha}{\cos\alpha} = \ldots \quad 3°$$

The applicability of the angle lever 25 for ensuring the accurate distance of the negative and positive from the negative results from the following deduction:

If $a$ is the distance of the negative, $b$ the distance of the positive from the obturator and $f$ the focal distance of the lens, the well known equation:

$$\frac{1}{a} \frac{1}{b} = \frac{1}{f} \text{ or } a \times f + bf = ab \text{ or } o = a \times b - af - bf$$

is valid.

If $f^2$ is added, the result will be: $f^2 = a \ b - a \ f - b \ f + f^2$ wherefrom results $f^2 = (b-f)(a-f)$. $f$ is therefore the average geometrical proportional between the distances $(b-f)$ and $(a-f)$. As the height of a right angled triangle is the average geometrical proportional to the hypothenuse sections a right angled triangle will be sufficient for this equation, the triangle having the height $f$ and the hypothenuse sections $(a-f)$ and $(b-f)$ situated in the plane traversing the rear main point of lens perpendicular to the optical axis, the height of the triangle being equal to $f$ and the end points of its hypothenuse having from positive and negative the distance $f$ (Fig. 13). This triangle may be parallelly displaced along the axis, for instance for a distance $x$, if this should be necessary for constructive reasons as is the case in the form of construction according to Figs. 8 to 10, the connecting line of the negative with the end point of the hypothenuse being shortened at the same time and the connecting line between the positive and the hypothenuse and point being lengthened, each for the distance $x$ or inversely. In this case as shown in Fig. 14

$$f^2 = [(b-x)-(f-x)][(a+x)-(f+x)]$$
$$f^2 = (b-f)(a-f).$$

The correction of a picture is carried out with the aid of the new device in the following manner:

The guide bars 16 and 30 are adjusted at the correct angles $\beta$ and $\gamma$ which have been found out previously with the aid of the above stated formula on the basis of the known angle $\alpha$ which is known or has to be calculated according to the distortion. The spindle 22 is turned until slide 17 and with it the slit 25 and the carriages 21 and 34

From Figs. 11 and 12 results that:

$$\frac{m}{m'} = mf : m'f = d : d + h = \frac{atg\alpha}{atg\alpha + a/tg\alpha} = \sin^2\alpha.$$

The two values $h''$ being supposed equal, $\gamma$ will be have arrived at the extreme positions shown. The negative 36 which has been photographed from an aeroplane is placed into the camera 35 so that the symmetrical axis of the negative stands horizontal in the apparatus, the part of the picture which at the exposure has been most reduced being at the rear. At the same time a sensitized plate 28 is inserted into the camera 27 and the source of light is started. By slowly rotating the screw spindle 22 the slit 25 is moved uniformly over the sensitized plate. The camera 27 with the sensitized plate is thus displaced in forward direction transversely to the optical axis and in the direction of the optical axis towards the lens. The camera 35 with the negative 36 is however displaced in the direction from the objective on the optical axis. The transverse displacement of the carriage has the effect that always new strips of the negative, which is immovable in transverse direction, act upon the sensitized layer, while the oppositely directed transverse displacement of the sensitized layer has the effect that always new strips of this layer are exposed. The longitudinal displacements ensure the sharp adjusting for each strip which, owing to the selection of the correct angle $\beta$, gives simultaneously the correct scale for each strip. In this manner strip after strip of the photograph is projected sharply and accurately enlarged upon the sensitized plate so that the picture produced on the same, measured in all directions, is of equal scale.

In the form of construction shown the lens is stationary, the sensitized layer and the slit are movable longitudinally and transversely to the optical axis and the negative is movable only along the optical axis. It is obvious however that one of the plates (the negative or the sensitized plate) could be stationary in the direction of the optical axis, in which case only the objective and the other plate are movable (Fig. 3).

Instead, as in the form of construction shown, to make movable transversely to the optical axis the sensitized plate and the slit carrier, the sensitized plate and the negative could be movable in this direction and the slit carrier could be stationary (Fig. 3).

Or the negative or the positive could be arranged inclined to the optical axis at an angle which corresponds with the inclination of the negative to the ground at the taking of the photograph (Fig. 2). If a negative inclined in this manner were stationary the positive and the slit arranged in front of the same ought to move transversely to the optical axis and the lens along the optical axis. The movement of the positive could be controlled by guide bars inclined with regard to the optical axis. The angles of inclination of these guide bars would have to be found out on the hand of similar deductions and equations as stated above with reference to the form of construction shown by way of example.

Having now particularly described and ascertained the nature of my said invention and in what manner the same is to be performed, I declare that what I claim is:

1. A method of transferring photographs from an obliquely exposed negative to a sensitized surface, in which the positive is exposed stripwise by means of a narrow slit, this slit moving over the negative and the positive owing to the mutual displacement of negative, positive and slit transversely to the optical axis, the lens, the negative and the positive being displaced with regard to one another in the direction of the optical axis so that the copy produced in strips is very sharp in all points and so that the copied strips measured in their longitudinal direction have all the same proportion of size to the photographed object, this proportion of size being however selected at will.

2. A method of transferring photographs from an obliquely exposed negative to a sensitized surface in which the positive is exposed stripwise by means of a narrow slit, this slit moving over the negative and the positive owing to the mutual displacement of negative, positive and slit transversely to the optical axis, the lens, the negative and the positive being displaced with regard to one another in the direction of the optical axis so that the copy produced in strips is very sharp in all points and so that the copied strips measured in their longitudinal direction have all the same proportion of size to the photographed object, this proportion of size being however selected at will, the positive and negative standing perpendicular to the optical axis and the scale in the direction of width of the copied strips being corrected by the mutual displacement of the positive and negative transversely to the optical axis.

3. A method of transferring photographs from an obliquely exposed negative to a sensitized surface in which the positive, the negative and an exposure slit being arranged perpendicular to the optical axis, the slit is moved perpendicular to the optical axis and perpendicular to its longitudinal direction in order to produce successive copies, the negative and the positive with the slit being moved in the direction of the optical axis in opposite directions the one to the other in order to sharply adjust the copy strips and to correct the scale of the copy strips in longitudinal direction, while the positive is being moved transversely to the optical axis for correcting the scale of projection in a direction transversely to the copy strips.

In testimony whereof I have signed my name to this specification.

CARL JANZER, Jr.